United States Patent [19]
Desai

[11] 4,211,697
[45] Jul. 8, 1980

[54] AZOANILINO-TOLUENE SULFONAMIDOALKYLENEAMINE CATIONIC DYES FOR PAPER

[75] Inventor: Kishor A. Desai, Lock Haven, Pa.

[73] Assignee: American Color & Chemical Corporation, Charlotte, N.C.

[21] Appl. No.: 4,444

[22] Filed: Jan. 18, 1979

[51] Int. Cl.² ............................................. C09B 29/08
[52] U.S. Cl. .................... 260/158; 260/156; 8/506
[58] Field of Search ............................. 260/158, 156

[56] References Cited
U.S. PATENT DOCUMENTS

| | | | |
|---|---|---|---|
| 3,709,870 | 1/1973 | Wolfrum | 260/174 |
| 3,881,866 | 5/1975 | Renfrew | 260/158 |
| 3,933,787 | 1/1976 | Moser | 260/156 |

OTHER PUBLICATIONS
Wallace et al. Chem. Abst. 69 (1968) #107600x.

*Primary Examiner*—Arthur P. Demers
*Attorney, Agent, or Firm*—Armstrong, Nikaido, Marmelstein & Kubovcik

[57] ABSTRACT

Cationic azo dyes useful for dyeing paper pulp and characterized by their outstanding affinity for paper pulp, both under waterleaf and sized dyeing conditions, are provided. The dyes have the structural formula:

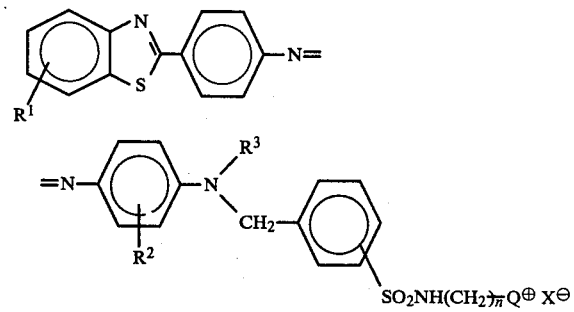

wherein $R^1$, $R^2$, $R^3$, Q, X and n are specifically defined.

2 Claims, No Drawings

AZOANILINO-TOLUENE SULFONAMIDOALKYLENEAMINE CATIONIC DYES FOR PAPER

BACKGROUND OF THE INVENTION

1. Field of the Invention

This invention relates to azo dyes and, more particularly, to reddish yellow cationic azo dyes characterized by their strong affinity for paper pulp.

2. Description of the Prior Art

Direct dyes for paper are well-known. Many of these dyes, however, when employed in conventional processes for dyeing paper, because of inadequate affinity for paper pulp, produce so-called white water containing environmentally significant amounts of the dyes. Ordinarily, the color must be destroyed before the white water can be discharged as effluent. The treatment of the white water is an additional and undesirable expense in the dyeing of paper.

There is, therefore, a great need for dyes for paper which have sufficient affinity for paper pulp such that the cost of treatment of white water is reduced or eliminated.

Moser, U.S. Pat. No. 3,933,787, discloses a process for the dyeing and printing of paper using azo dyes of the basic structural formula:

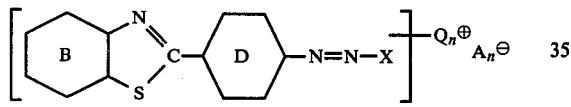

where X is the radical of a coupling component of the aminobenzene, hydroxybenzene, aminonaphthalene or heterocyclic series.

It has now been found according to the present invention that certain cationic azo dyes wherein the base corresponds to that of the azo dyes of Moser, have excellent affinity for paper pulp under both sized and waterleaf dyeing conditions. These dyes enable the paper to be dyed even in heavy shades without any appreciable loss of dye in the white water. There is practically no dye left in the white water. The dyes also have fair to good fastness to acid, alkali and chlorine.

The coupler of the cationic azo dyes according to the present invention is disclosed in Renfrew, U.S. Pat. No. 3,881,866. The quaternary dyes of Renfrew which can include thiazoles or benzothiazoles as the base, are disclosed as having utility in the dyeing of acrylic fibers.

SUMMARY OF THE INVENTION

In accordance with the present invention there are provided dyes of the general structural formula:

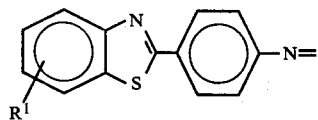

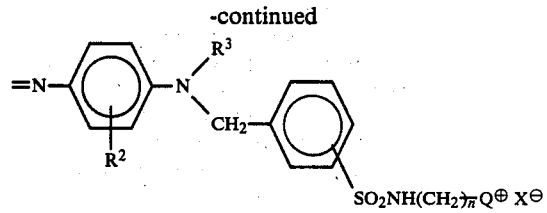

wherein
$R^1$ is H or $CH_3$;
$R^2$ is H, lower alkyl, lower alkoxy, chloro or bromo;
$R^3$ is lower alkyl and cyano lower alkyl;
$Q$ is $N(R^4)_3$, where $R^4$ is lower alkyl; or is

$n$ is an integer of 2–4; and X is an anion and is, preferably, chloro, bromo, methosulfate, ethosulfate or methanesulfonate.

As used herein the term "lower" is intended to refer to groups containing 1–4 carbon atoms.

DESCRIPTION OF PREFERRED EMBODIMENTS

The dyes according to the present invention may be prepared in the art by diazotizing an amine of the formula (I):

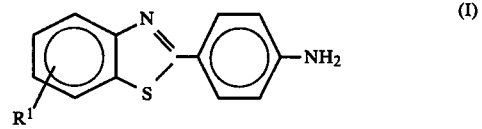

where $R^1$ is as defined above; and adding the diazonium salt to a cold aqueous solution of the appropriate coupling component.

The amines of formula (I) are themselves known and can be prepared according to conventional procedures. A preferred base is 2-(p-aminophenyl)-6-methyl-benzothiazole. The couplers useful in preparing the cationic azo dyes according to the present invention can be prepared by the procedures described in Columns 3 and 4 of Renfrew, U.S. Pat. No. 3,881,866. These procedures are incorporated herein by reference. Generally, the couplers are synthesized by chlorosulfonation of N-alkyl-N-phenylbenzylamine followed by reaction with an N,N-dialkylaklylenediamine or an aminoaklylenechloride having 2–4 carbon atoms in their alkylene chains. Quaternization is accomplished by reacting with alkylating agents or pyridine. A preferred coupling component is 1,1,1-trimethyl-1-[2-{α-(N-ethylanilino)-m-toluenesulfonamide}-ethyl]-ammonium methane sulfonate. This coupler may be prepared by a procedure analogous to that of Example 3 of Renfrew.

The cationic azo dyes according to the present invention are made by the reaction of the diazotized base with the cationic coupler by adding the diazonium salt to a cold aqueous solution of the coupler. A buffering agent, such as sodium acetate, is added to maintain a pH of 5 to 7, preferably about 5.5. The mixture is allowed to react for about 16 hours at room temperature. The dye is isolated by concentration and cooling.

The dyes according to the present invention prepared according to the above-described procedures are used to dye paper stock according to conventional procedures by dissolving the dyes in water or mixtures of water and acetic acid. The dyes show outstanding affinity for paper pulp under both waterleaf and sized dyeing conditions and dye paper in reddish yellow shades which exhibit outstanding water bleedfastness and good acid, alkali and chlorine fastness properties.

The invention is further illustrated in the following examples.

EXAMPLE I
Preparation of the Compound:

To a two liter beaker with constant mechanical stirring there were added: 336 parts of water, 100.8 parts of finely ground 2-(p-aminophenyl)-6-methylbenzothiazole, 71.8 parts of 32% hydrochloric acid and 588 parts of ice.

The solution was then cooled down to 0°–5° C. and then there were added: 71.8 parts of 32% hydrochloric acid following by a dropwise addition of 31.9 parts of sodium nitrite dissolved in 65 parts of water. The resultant solution was stirred for two hours at 0°–5° C. and then there were added: 0.1 parts of sulfamic acid to destroy excess of nitrite.

The solution was then filtered and the diazonium solution was added to a two liter beaker containing 197.8 parts of 1,1,1-trimethyl-1-[2-{α-(N-ethylanilino)-m-toluenesulfonamido}-ethyl]-ammonium methane sulfonate dissolved in 800 parts of water and 150 parts of ice.

The solution was stirred at 5°–10° C. for two hours. The pH of the solution was raised to 5.5 by addition of saturated solution of sodium acetate and was then stirred for 16 hours at 5°–20° C.

The product was then isolated by concentration and cooling. It was then dried in an oven at 80° C. The yield was 288.2 grams.

EXAMPLES II–V

By following the procedures of Example I and employing the appropriate base and coupler, cationic dyes according to the present invention, wherein $R^1$, $R^2$ and $R^3$ are as shown below, may be prepared:

| Example No. | $R^1$ | $R^2$ | $R^3$ |
| --- | --- | --- | --- |
| II | H | H | $CH_2CH_3$ |
| III | $CH_3$ | $CH_3$ | $CH_2CH_3$ |
| IV | $CH_3$ | H | $CH_3$ |
| V | $CH_3$ | $CH_3$ | $CH_3$ |

The dyes of these examples will also show outstanding affinity in the dyeing of paper.

Although the invention has been described in conjunction with certain preferred embodiments, it is not intended to be limited thereto but, instead, includes all those embodiments within the scope and spirit of the appended claims.

What is claimed is:

1. A cationic dye characterized by outstanding affinity for paper pulp, and having the structural formula:

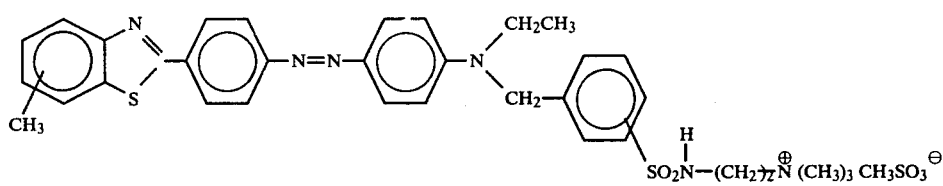

wherein
$R^1$ is H or $CH_3$;
$R^2$ is H, lower alkyl, lower alkoxy, chloro or bromo;
$R^3$ is lower alkyl or cyano lower alkyl;
Q is $N(R^4)_3$, where $R^4$ is lower alkyl, or is n is an integer of 2–4; and
X is chloro, bromo, methosulfate, ethosulfate, or methanesulfonate.

2. A cationic azo dye of the formula, where X is as defined in claim 1.

* * * * *